Oct. 25, 1966  J. L. CHRISTMANN  3,281,070
INTEGRATING A VARIABLE LOAD TRAVELING AT A VARIABLE SPEED
Filed June 1, 1964  8 Sheets-Sheet 1

INVENTOR
J. L. CHRISTMANN
BY John A. Seifert
ATTORNEY

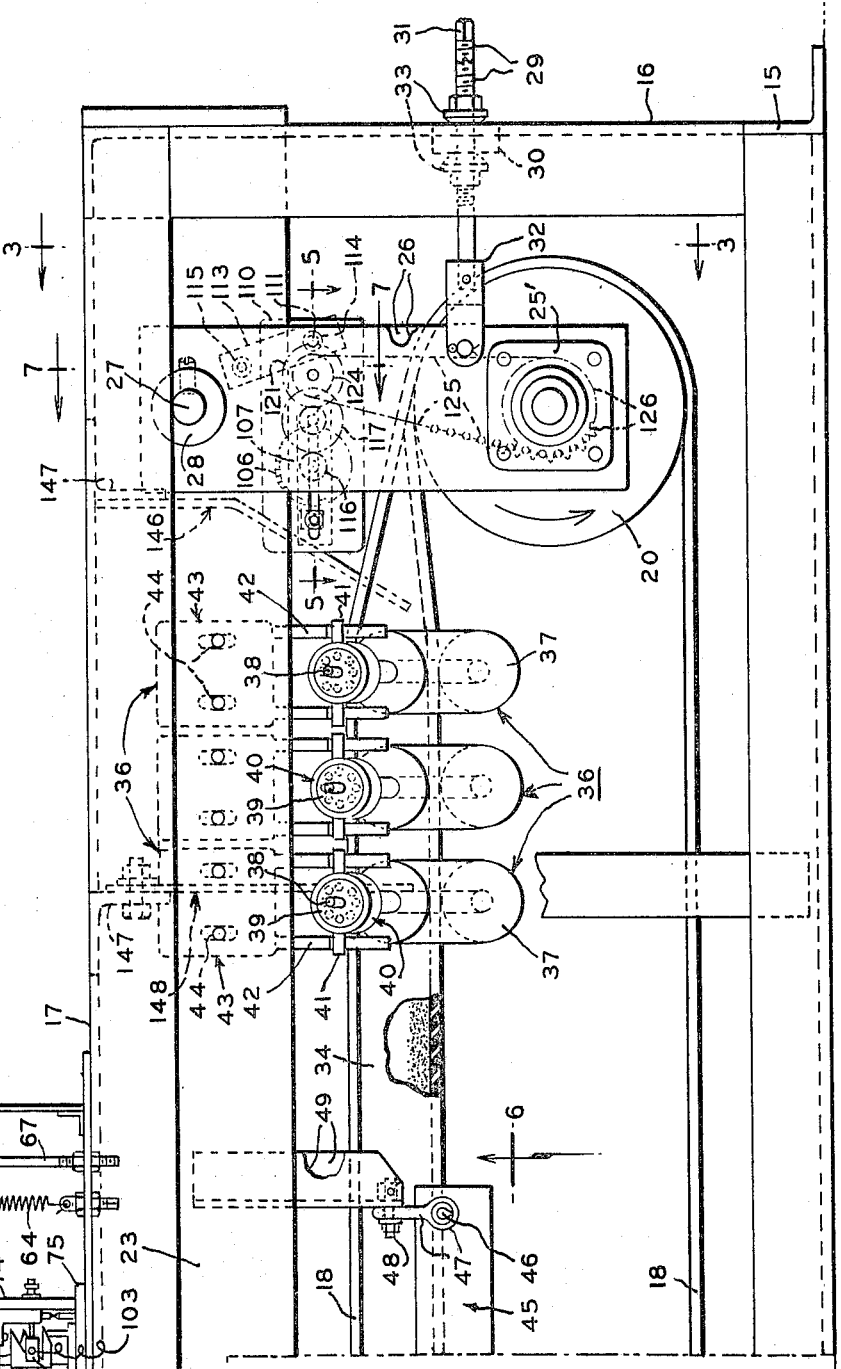

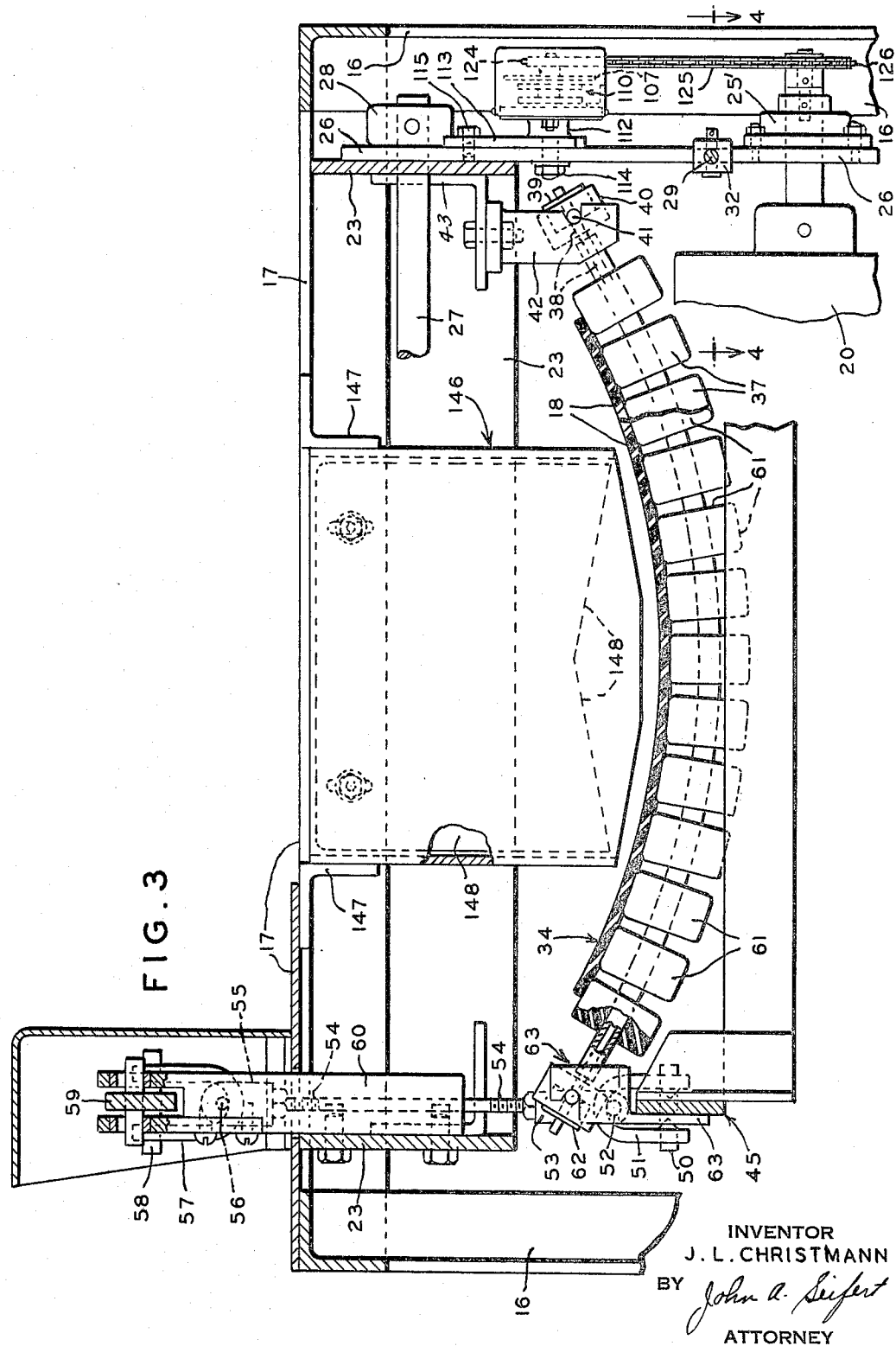

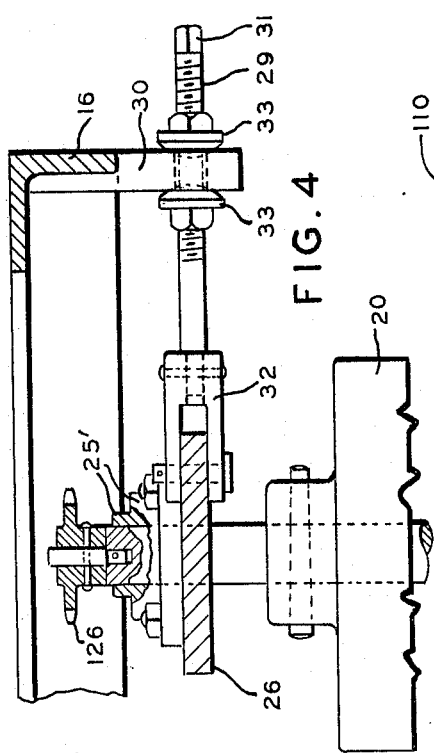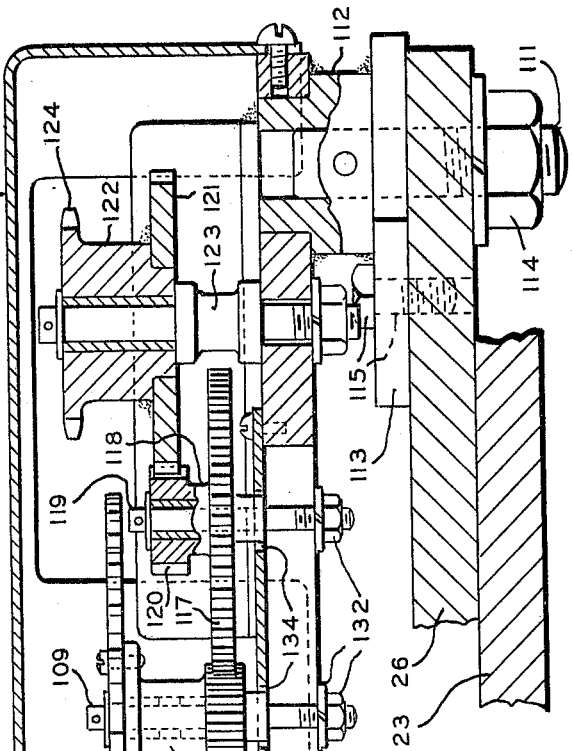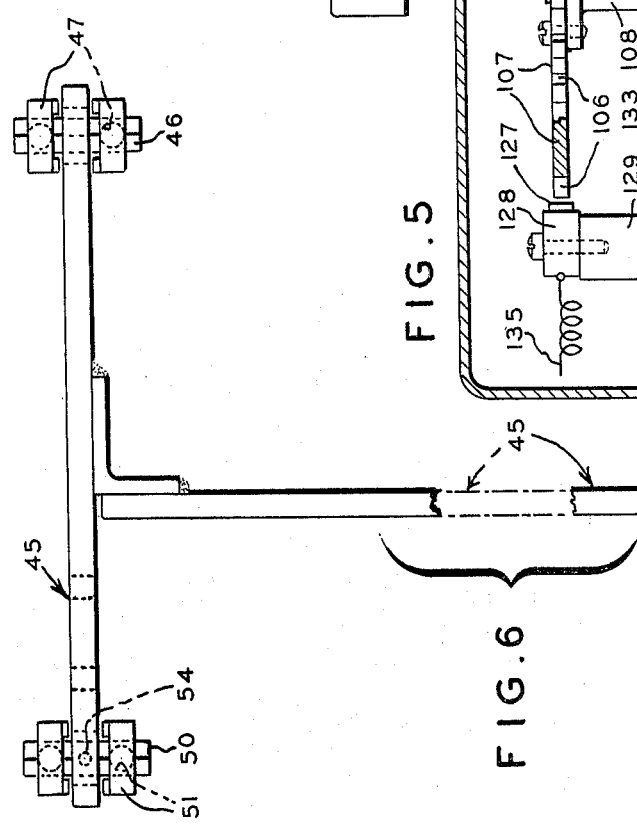

Oct. 25, 1966        J. L. CHRISTMANN        3,281,070
INTEGRATING A VARIABLE LOAD TRAVELING AT A VARIABLE SPEED
Filed June 1, 1964        8 Sheets-Sheet 5
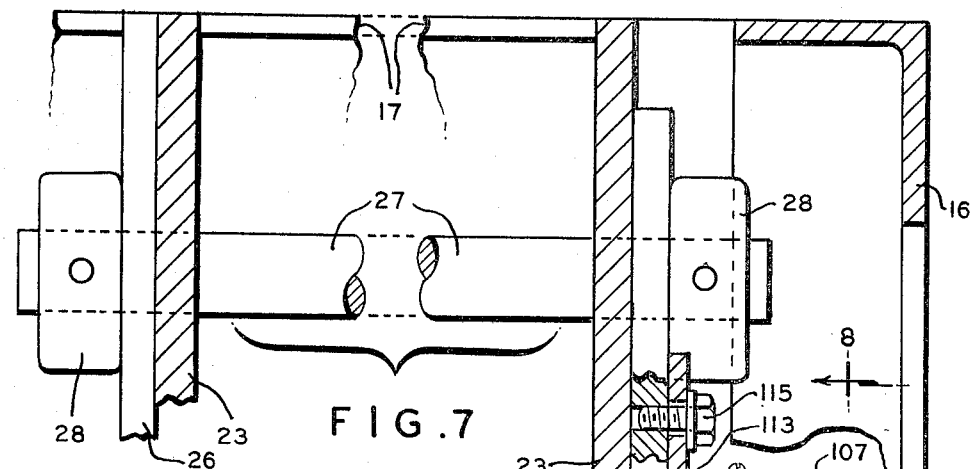
FIG.7
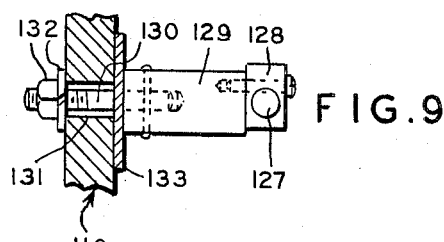
FIG.9
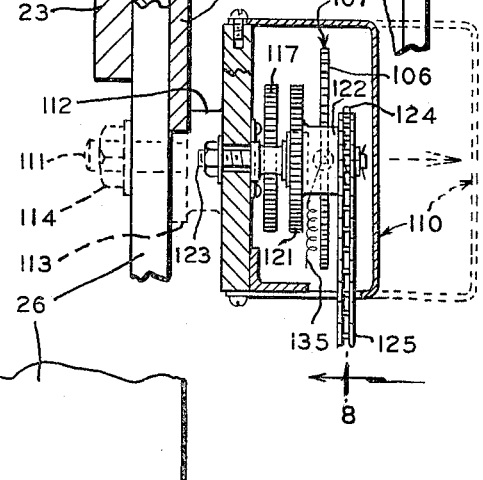
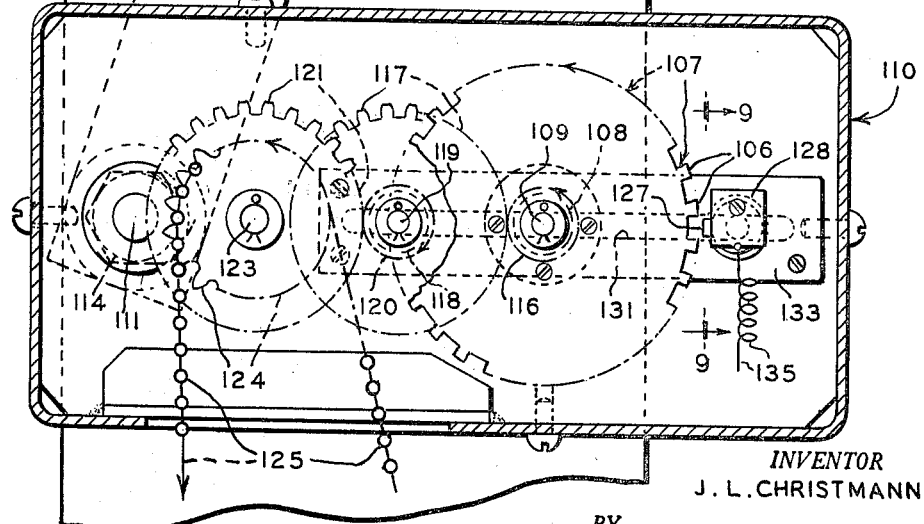
FIG.8
INVENTOR
J. L. CHRISTMANN
BY John A. Seifert
ATTORNEY

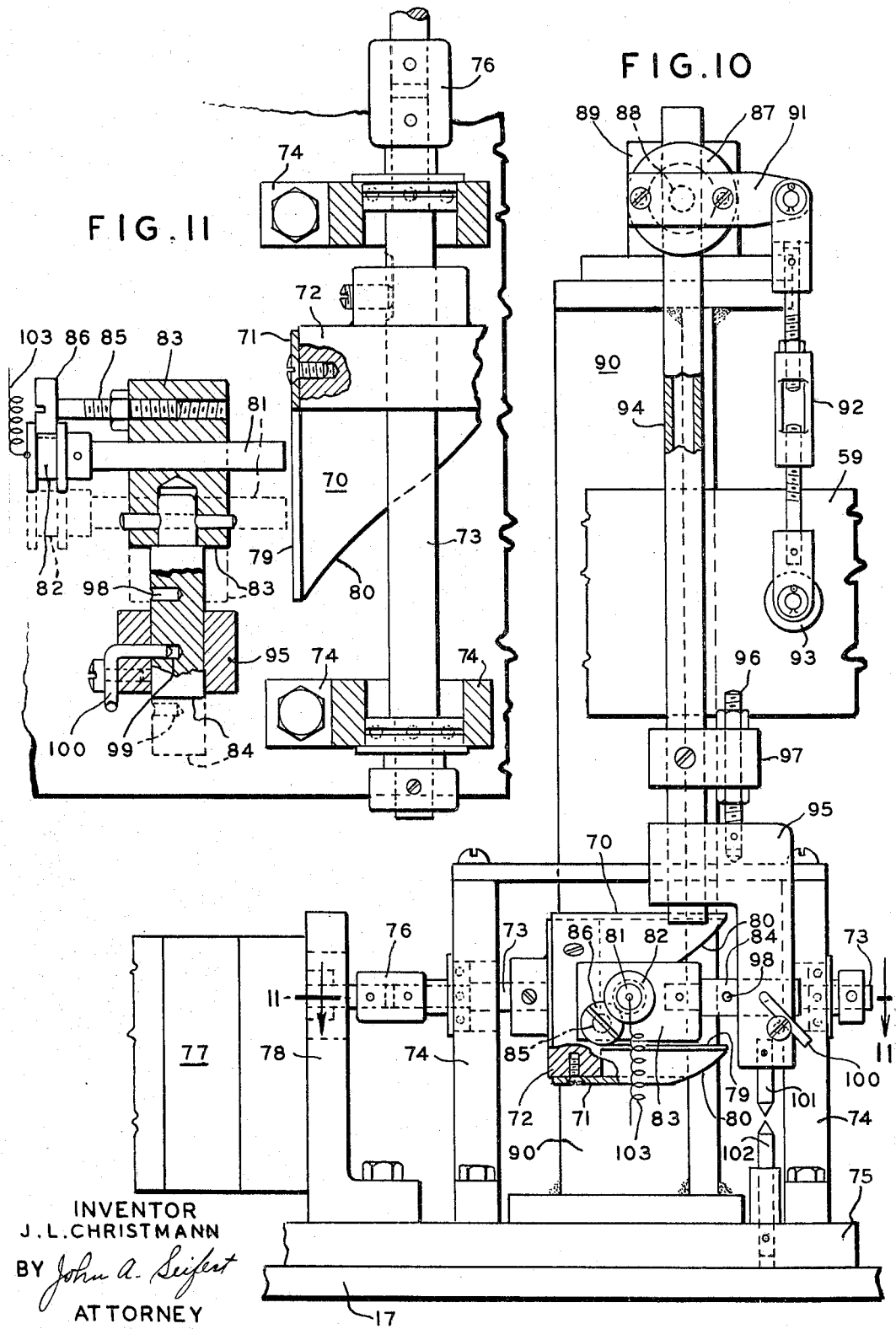

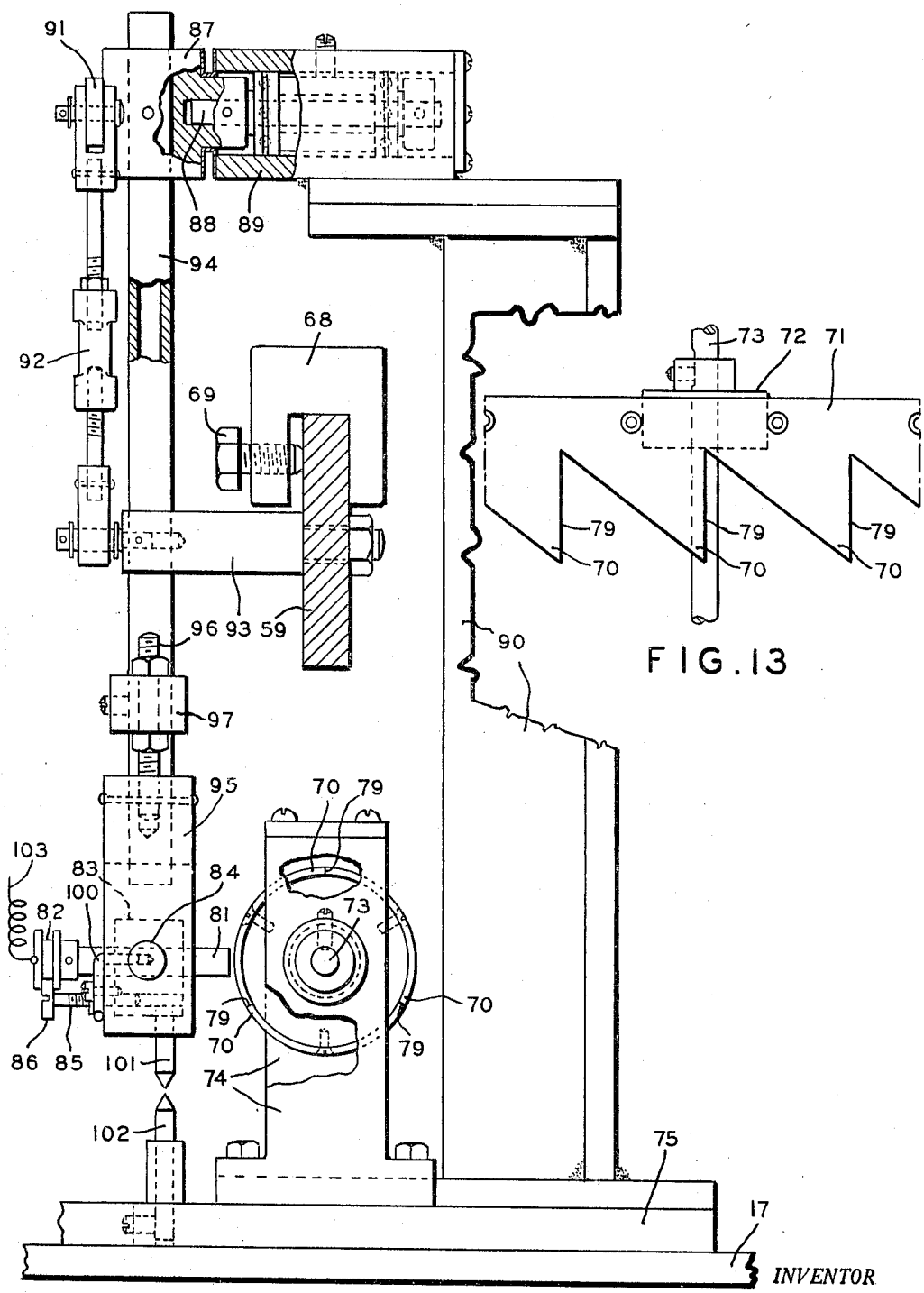

United States Patent Office 3,281,070
Patented Oct. 25, 1966

3,281,070
INTEGRATING A VARIABLE LOAD TRAVELING AT A VARIABLE SPEED
John L. Christmann, Passaic, N.J., assignor to Merrick Scale Mfg. Company, Passaic, N.J., a corporation of New Jersey
Filed June 1, 1964, Ser. No. 371,668
17 Claims. (Cl. 235—61)

This invention relates to means for integrating the product of two variables, such as a load on a traveling conveyor.

An object of the invention is to provide an integrator which is very compact, requiring only a small motor rotating a first annular series of triangularly shaped teeth in connection with a load sensing device, such as a scale beam.

Another object of the invention is to provide an integrator which requires no mechanical contact between the load sensing device and the integrator.

A further object of the invention is to provide an integrator in which the transmission of the speed of travel of the conveyor only requires enough torque to rotate a second annular series of teeth and can be located at any point on the conveyor.

The simplicity of this integrator makes this a low cost unit.

Further objects and advantages of the invention will be set forth in the detailed description of the invention.

In the drawings accompanying and forming a part of this application:

FIGURE 2 is a side elevational view of a load receiving end portion of the conveyor showing the remaining part of the load sensing device coupled to a first induction coil associated with the first annular series of teeth and the second series of teeth rotated by the travel of the conveyor relative to a second induction coil;

FIGURE 3 is a composite cross-sectional view, on an enlarged scale, taken on both lines 3—3 of FIGURES 1 and 2 looking in the directions of the arrows to show the manner of transmitting the load to the sensing device and of transmitting the speed of travel of the conveyor to the second annular series of teeth;

FIGURE 4 is a fragmentary sectional plan view, on an enlarged scale, taken on the line 4—4 of FIGURE 3 looking in the direction of the arrows to show the manner of regulating the tension of the conveyor;

FIGURE 5 is a fragmentary sectional plan view, on an enlarged scale taken on the line 5—5 of FIGURE 2 looking in the direction of the arrows to show a driving connection between the conveyor and the second annular series of teeth;

FIGURE 6 is a fragmentary plan view, on an enlarged scale looking from the line 6—6 of FIGURES 1 and 2 showing part of means for suspending a load section of the conveyor from the load sensing device or scale beam;

FIGURE 7 is a fragmentary sectional view, on an enlarged scale, taken on the line 7—7 of FIGURE 2 looking in the direction of the arrows to show the manner of transmitting the speed of travel of the conveyor to the second annular series of teeth;

FIGURE 8 is a sectional view, on an enlarged scale, taken on the line 8—8 of FIGURE 7 looking in the direction of the arrows to show the relationship between the transmission means and the second annular series of teeth;

FIGURE 9 is a fragmentary sectional view taken on the line 9—9 of FIGURE 8 looking in the direction of the arrows to show the mounting of the second induction coil relative to the second annular series of teeth;

FIGURE 10 is an elevational view, on an enlarged scale, of the first annular series of teeth, their associated induction coil, and the manner of mounting and connecting said induction coil to a scale beam;

FIGURE 11 is a sectional view, on an enlarged scale, taken on the line 11—11 of FIGURE 10 looking in the direction of the arrows;

FIGURE 12 is an elevational view of the first annular series of teeth, the associated induction coil and the mounting of said induction coil and its connection to the scale beam looking at the right hand side of FIGURE 10;

FIGURE 13 is a development view of the first annular series of teeth; and

Figure 1:
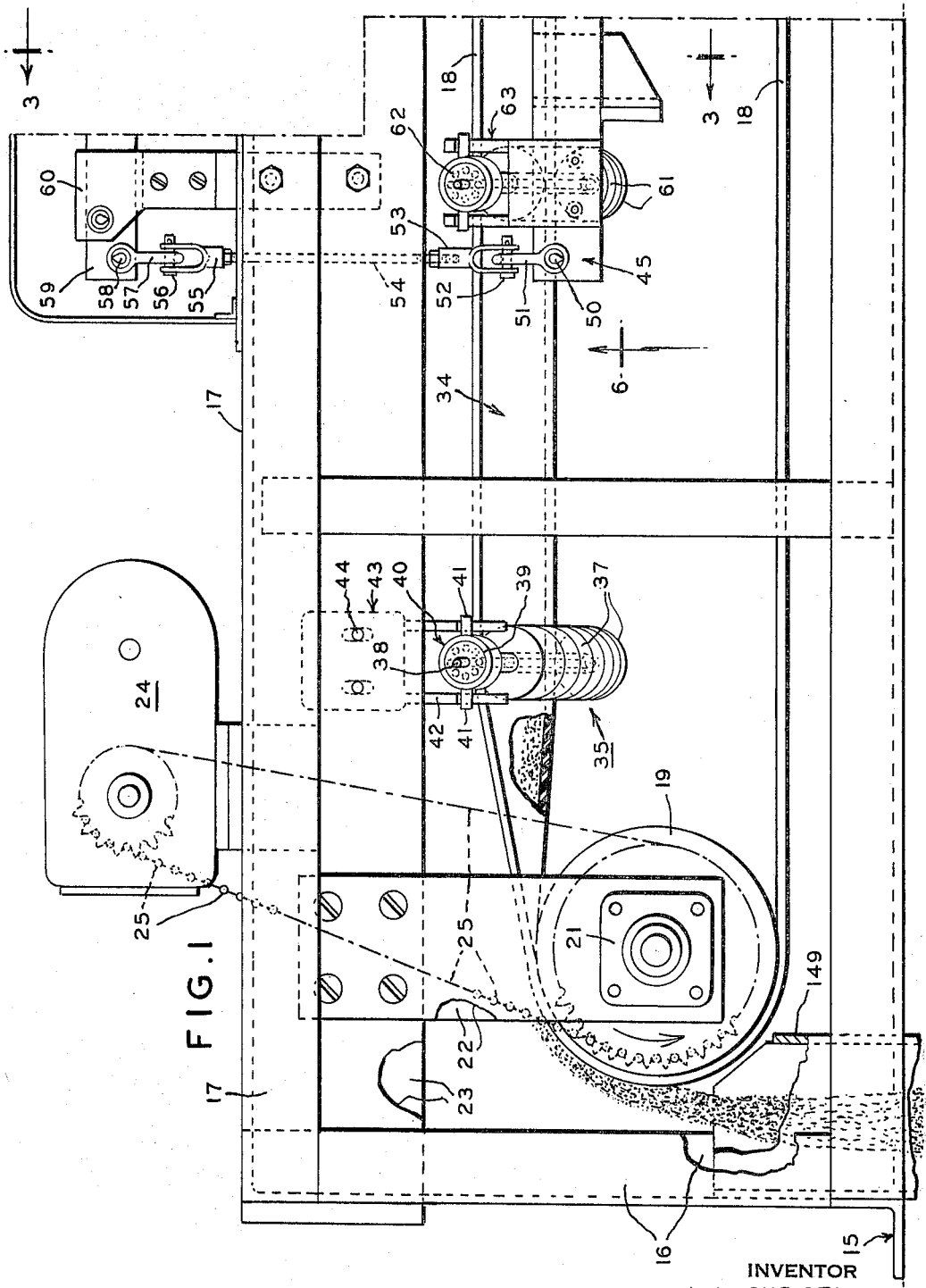
FIGURE 1 is a side elevational view of a discharge end portion of a conveyor showing a part of the load sensing device.

The embodiment of the invention is shown in FIGURES 1 to 4, inclusive, as being supported by a framework consisting of a rectangular base 15 supporting uprights 16 and horizontal top members 17.

An endless conveyor belt 18 is supported by pulleys 19 and 20. The pulley 19 is rotatably mounted in bearings 21 secured in the lower ends of hangers 22 having the upper ends mounted on side members of a frame 23 supported within the upper portion of the framework 15–17. The pulley 19 is driven by a motor 24, FIGURE 1, mounted on the framework members 17, and connected to said pulley 19 by a sprocket chain 25. The pulley 20 is rotatably mounted in bearings 25' secured on the lower ends portions of hangers 26 having the upper end portions adjustably mounted on the opposite end portions of a shaft 27 supported by the side members of the frame 23 and said hangers 26 are retained on said shaft 27 by collars 28, as shown in FIGURES 2 and 3. The tension of the conveyor belt 18 is adjusted by a pair of screws 29 slidably mounted in ear portions 30 secured to and extended inwardly from opposite uprights 16, as shown in FIGURES 2 and 4. One end of each screw 29 is provided with a manipulating head 31 positioned exteriorly of the framework 15–17 and the opposite end of said screw 29 is provided with a bifurcation 32 pivotally connected to each hanger 26. The screws 29 are adjusted to regulate the tension of the conveyor belt 18 by nuts 33 threaded on the screws 29 on the opposite faces of the ear portions 30.

The upper stretch of the conveyor belt 18 is supported in trough formation, as shown at 34 in FIGURES 1 to 3, inclusive, by a set of joy limberollers 35 adjacent to the pulley 19, as shown in FIGURE 1, and a set of three joy limberollers 36 adjacent to the pulley 20, as shown in FIGURE 2. Each of the joy limberollers comprises a plurality of spaced rollers 37 mounted on a neoprene or rubber covered steel cable 38 attached at each end to sealed ball bearings 39 within housings 40 provided with laterally extending pins 41 mounted in hangers 42 secured to brackets 43 adjustably mounted on the side members of the frame 23, as shown at 44 in FIGURES 1 and 2.

An intermediate portion of the upper stretch 34 of the conveyor belt 18 is supported by a suspension frame 45 having one end portion of the side members of said frame provided with laterally extending knife edge pivots 46 engaged in clevises 47 mounted on pins 48 fixed in brackets 49 secured to the side members of the frame 23, as shown in FIGURE 2. One side member at the opposite end portion of the suspension frame 45 is provided with laterally extending knife-edged pivots 50 engaged in a clevis 51 mounted on a transverse pin 52 of a turnbuckle 53 adjustably mounted on the lower end of a rod 54 having the upper end adjustably connected to a turnbuckle 55 having a transverse pin 56 engaged in a clevis 57 pivotally mounted on knife-edged pivots 58 extended laterally from one end portion of a scale beam 59 pivotally mounted adjacent to said pivots 58 in the bifurcated end of a bracket 60 secured to one side member of the frame 23, as shown in FIGURES 1 and 3. The end portion of the suspension frame 45 provided with the knife-edged pivots 50 is also provided with a set of joy limberollers 61 having ball bearings 62 supported in brackets 63 secured on the side members of the suspension frame 45. The joy limberollers 61 are constructed in the same manner as the joy limberollers 35 and 36.

The material is delivered to the portion of the upper stretch 34 of the conveyor belt 18 supported by the limberollers 36. This is accomplished by a three sided loading chute 146 suspended from a rectangular frame 147 supported by the upper framework members 17, and a manually adjustable gate 148 forming the fourth side of the loading chute 146, as shown in FIGURES 2 and 3.

The material is discharged from the upper stretch 34 of the conveyor belt 18 into a chute 149 supported by the framework at the discharge side of the pulley 19.

The scale beam 59 opposite the end portion pivoted on the bracket 60 is deflected in proportion to the load by a spring 64 having the lower end achored to a framework member 17 and the upper end connected to the scale beam 59, as shown in FIGURE 2. The deflection of the beam 59 by the spring 64 is limited by a projection 65 extended from said beam and between two stops 66 adjustably mounted on a post 67 supported by the framework member 17, as shown in FIGURE 2.

The scale beam 59 is balanced by slider or poise weight 68 slidable on said scale beam and secured in balanced position by a set screw 69, as shown in FIGURES 2 and 12.

The part of the integrating means for evaluating the variable load comprises a first annular series of triangular teeth 70 formed from tubular steel stock having an annular base 71 secured to a circular hub member 72 fixed to one end of a shaft 73, as shown in FIGURES 10, 11, 12 and 13. The shaft 73 is rotatably supported in a pair of uprights 74 of a base 75 secured to the framework member 17 below the scale beam 59. One end of the shaft 73 is provided with a coupling 76 operatively connected to sychronous electric motor 77 supported by a bracket 78 secured to the base 75, as shown in FIGURES 2 and 10. In the present illustration of the invention, there is shown three teeth 70 with one side of each tooth being straight, as at 79, and the other side of each tooth being helical, as at 80, so that the space or gap between said teeth will progressively increase in width outwardly from the base 71. The particular shape and number of teeth 70 could be varied as long as the developed tooth is triangular in shape so that movement axially along the teeth 70 and the base 71, the tooth width increases and decreases proportionally to the axial displacement.

An induction coil is mounted in a cylindrical casing 81 having at one end an annular groove 82 and slidably mounted in a block 83 fixed on one end of a pin 84. The induction coil casing 81 is adjusted transversely of the block 83 and pin 84 by a screw 85 adjustably mounted in the block 83 and having a head 86 positioned in the groove 82 whereby rotation of the screw 85 will longitudinally adjust the casing 81 for a purpose to be hereinafter described. The induction coil casing 81 is displaced longitudinally of the teeth 70 and the base 71 proportionally to the load on the portion of the conveyor belt supported by the suspension frame 45. This is accomplished by a bell-crank lever comprising a head 87 secured on a shaft 88 rotatably mounted in a housing 89 supported by a standard 90 mounted on the base 75, as shown in FIGURES 10 and 12. Rotary movement is imparted to the head 87 proportional to the load deflection of the scale beam 59 by an arm 91 fixed to the head 87 and adjustable linkage 92 pivotally connected to said arm 91 and to a post 93 fixed in the scale beam 59 and extended laterally therefrom. The upper end portion of a rod 94 is secured in the head 87 and the lower end portion of said rod 94 is slidable in the horizontal leg of an inverted L-shaped bracket 95 with the vertical leg of said bracket 95 slidably supporting the pin 84. The bracket 95 is adjusted longitudinally of the rod 94 by a screw 96 having one end secured to the bracket 95 and adjustably mounted in an arm 97 fixed on the rod 94. Since this integrator cannot show a negative balance, the coil casing 81 is adjusted, with the conveyor belt 18 running empty, from its normal position to a predetermined position, for example, equivalent to one-quarter load. In this adjusted position, the integrator should totalize a predetermined count per time unit at a certain conveyor belt speed. If the actual count is higher or lower, showing a plus or minus balance, the rider weight 68 is adjusted on the scale beam 59 until the correct count is reached. The adjustment of the coil casing 81 is accomplished by providing the pin 84 with two holes 98 and 99, hole 98 representing the adjusted position of the coil casing 81 relative to the teeth 70 and base 71, and the hole 99 representing the normal position of the coil casing 81 relative to the teeth 70 and the base 71. The coil casing 81 is retained in either of said positions by a locking pin 100 adjustably carried by the bracket 95, as shown in FIGURES 10, 11 and 12. Balance of the scale beam 59 is indicated by a plumb point 101 extended from the end of the vertical leg of the bracket 95 and a plumb point 102 extended from the base 75.

The coil casing 81 is positioned in alignment with the base 71 when the scale beam 59 is at balance or no load position and is moved longitudinally toward the points of the teeth 70 proportionally to the increase in the load so that at maximum load, the coil casing 81 is positioned where the spaces or gaps are maximum.

The adjustment of the screw 85 assures the proper electrical response in the induction coil within the casing 81.

Figure 14:
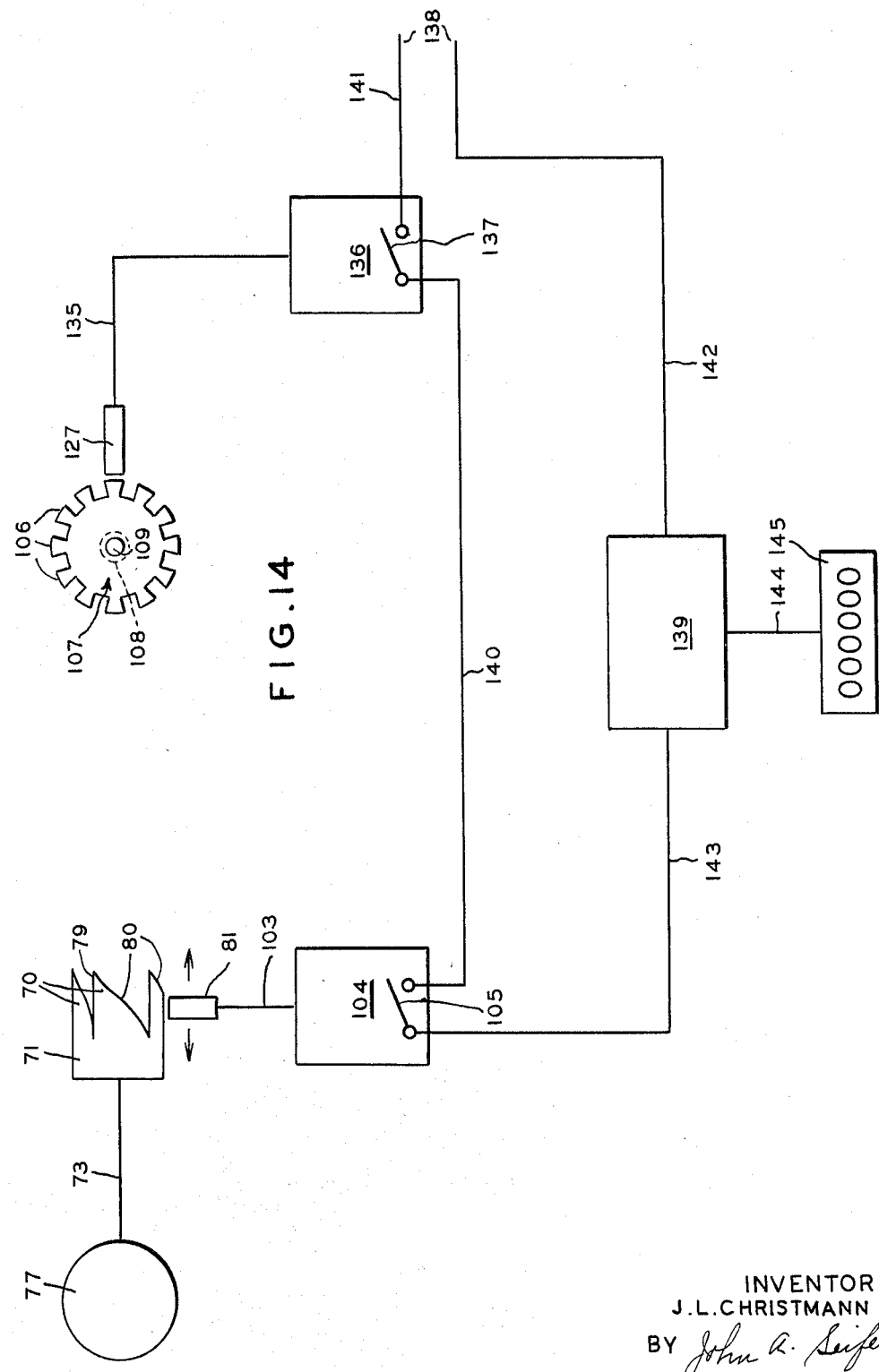
FIGURE 14 is a diagrammatic view of the electric circuit of the induction coils with amplifiers, a pulse divider and a magnetic or pulse operated counter.

The induction coil within the casing 81 is electrically connected as shown by line 103 to an amplifier diagrammatically indicated at 104 in FIGURE 14 and the circuitry of said amplifier being shown as having output relay contacts 105 adapted to be actuated to open position when the coil casing 81 is opposite the metal of the teeth 70 and the base 71 and said output relay contacts 105 are actuated to closing position when the coil casing 81 is opposite the air gaps between the teeth 70, so that length of time in which the contacts 105 are closed will be longer proportionally to the travel of the coil casing 81 toward the points of the teeth 70, and therefore the contact closing time is proportional to the load on the portion of the conveyor belt supported by the suspension frame 45.

It is to be understood that the contacts 105 could be reversely actuated, that is the contacts 105 are closed at balance with the coil casing 81 opposite the metal of the base 71 or when the coil casing 81 is opposite the metal of the teeth 70, and the contacts 105 are in open position when the coil casing 81 is opposite the air gaps between the teeth 70.

Also the circuitry of the amplifier 104 could be of solid state type.

The other part of the integrating means for evaluating the variable speed comprises a second annular series of teeth 106 equidistantly spaced around the periphery of a steel wheel 107. The wheel 107 is secured to a hub 108 rotatably mounted on a stud 109 mounted on a base wall of a cabinet 110 adjustably supported from one of the hangers 26 by a stud 111 having one end secured in a boss 112 on the exterior of the base wall of the cabinet 110. The opposite end of the stud 111 is screw-threaded and extended through an end portion of a plate 113 secured to the boss 112 and through said hanger 26. The end of the stud 111 extended from the hanger 26 is engaged by a nut 114 which secures the cabinet 110 to said hanger 26. The opposite end of the plate 113 is secured to the hanger 26 by a bolt 115 after the cabinet 110 has been properly mounted as described hereinafter. The wheel 107 is rotated at a speed proportional to the speed of travel of the conveyor belt 18 by providing the hub 108 with a pinion 116 meshing with a gear 117 having a hub 118 rotatable on a stud 119 mounted on the base wall of the cabinet 110. The hub 118 is provided with a pinion 120 meshing with a gear 121 secured on a hub 122 rotatable on a stud 123 mounted on the base wall of the cabinet 110. The hub 122 is provided with a sprocket wheel 124 engaged by a sprocket chain 125 extended through an opening in the bottom wall of the cabinet 110 and engaged around a sprocket wheel 126 fixed on the shaft of the pulley 20. The bolt 115 is properly located in the hanger 26 after the sprocket chain 125 is properly tensioned.

A second induction coil is mounted in a casing 127 carried by a block 128 secured on an end of a bracket 129 having the opposite end secured on a stud 130 mounted on the base wall of the cabinet 110. The studs 109, 119 and 130 are adjustably mounted on the base wall of the cabinet 110 by reducing the end portions of the studs 109 and 119 to the diameter of the stud 130 and engaging said ends and the stud 130 in a slot 131 in the base wall of the cabinet, said slot being of a width slightly larger than the diameters of the reduced ends of the studs 109 and 119 and of the diameter of the stud 130, so that coil casing 127 is adjusted toward or away from the teeth 106. The studs 109, 119 and 130 are retained in adjusted positions by nuts and washers engaged on screw-threaded ends of said studs 109, 119 and 130 extended exteriorly of the base wall of the cabinet 110, as shown at 132 in FIGURES 5 and 9, to clamp the bodies of the studs 109 and 119 and the bracket 129 against the inner surface of the base wall at the top and bottom of said slot 131 of the cabinet 110. To prevent dust and dirt entering the cabinet 110 through the slot, said slot is closed by a plate 133 secured to the inner surface of the cabinet base wall with appropriate openings for the passage of the bodies of the studs 109 and 119 and of the bracket 129, as shown at 134 in FIGURE 5.

The induction coil in the casing 127 is electrically connected as shown by line 135 to an amplifier diagrammatically shown at 136 in FIGURE 14 as having output relay contacts 137. It is to be understood that the amplifier 136 could have a solid state circuitry. The rotation of the wheel 107 proportional to the travel of the conveyor belt 18 will intermittently open and close the output relay contacts 137 at a rate proportional to the speed of travel of the conveyor belt.

The output relay contacts 105 and 137 are in series and connected to a direct current supply 138 and to a pulse divider diagrammatically shown at 139 in FIGURE 14 by lines 140, 141, 142 and 143. The pulse divider 139 is electrically connected as shown by line 144 to a pulse operated counter diagrammatically shown at 145 in FIGURE 14 to operate the same and indicate the integrated load on the conveyor belt 18.

The counter 145 may be directly operated by the amplifiers 104 and 136 as the pulse divider 139 is only used to provide the proper range steps for the integrator and counter registration unit in multiples of ten.

The operation of the invention is as follows: The electric pulses from the indication coil in casing 127 are allowed to reach the pulse divider 139 only when the coil in the casing 81 senses a gap between the teeth 70 and are blocked during the time said coil in casing 81 senses the teeth 70 or the base 71. The number of electric pulses in the pulse train are therefore proportional to the deflection of the scale beam 59 and the load on the suspension frame 45. The electric pulse frequency of the coil in casing 127 varies with the speed of the conveyor belt 18 and therefore increases or decreases with the speed of said conveyor belt. In this manner the electric pulses reaching the pulse divider 139 will reflect correctly the product of load (pounds per foot on the conveyor belt 18) times the speed (feet per minute of travel of the conveyor belt 18). The design pulse frequency and the pulse divider are used to cover a wide range of conveyor scale capacities.

Having thus described my invention, I claim:

1. Means for integrating a variable load traveling at a variable speed, comprising a first annular series of spaced triangular shaped teeth rotated at a constant speed, a first induction coil movable parallelly of the axis of rotation of the teeth from the bases to the apexes of the teeth in proportion to the variable load, a first amplifier electrically connected to the first induction coil and having a circuitry adapted to be opened and closed by the position of the first induction coil relative to a tooth and to a space between the teeth of the first annular series of teeth, a second annular series of spaced teeth rotated at a speed proportional to the variable speed, a second induction coil fixed in proximity to the path of travel of the second series of teeth, a second amplifier electrically connected to the second induction coil and having a circuitry adapted to be alternatively opened and closed by the rotation of the second series of teeth, the circuitry of both amplifiers being electrically connected to a source of electricity, and a counter electrically connected to and operated by both induction coils, whereby the number of pulses reaching the counter reflect the product of the variable load and the variable speed.

2. Means for integrating a variable load traveling at a variable speed as claimed in claim 1, wherein each tooth of the first annular series of spaced triangular shaped teeth consists of a straight side and a helical side.

3. Means for integrating a variable load traveling at a variable speed as claimed in claim 1, wherein the circuitry of both amplifiers comprises output relay contacts adapted to be opened when the associated induction coil is adjacent to the teeth of its series of teeth and are closed when the associated induction coil is adjacent to the spaces between the teeth of its series of teeth.

4. Means for integrating a variable load traveling at a variable speed as claimed in claim 1, a pulse divider electrically connected to both amplifiers and the counter.

5. Means for integrating a variable load traveling at a variable speed as claimed in claim 4, wherein the output circuitry of both amplifiers and the pulse divider are electrically connected in series.

6. Means for integrating a variable load traveling at a variable speed, comprising a tubular member rotated at a constant speed and arranged with spaced triangular shaped teeth having their apexes at one end of the tubular member and their bases spaced from the opposite end of the tubular member, a first induction coil movable axially of the tubular member from the bases of the triangular shaped teeth in proportion to the variable load, a first amplifier electrically connected to the first induction coil and having a circuitry adapted to be opened and closed by the position of the first induction coil relative to the teeth and the spaces between the teeth of the tubular member, an annular series of spaced teeth rotatable at a speed proportional to the variable speed, a second induction coil fixed in proximity to the path of travel of the annular series of spaced teeth, a second amplifier electrically connected to the second induction coil and having a circuitry adapted to be alternatively opened and closed by the rotation of the annular series of spaced teeth, the circuitry of both amplifiers being electrically connected to a source of electricity, and a counter electrically connected to and operated by both amplifiers, whereby the number of pulses reaching the counter reflect the product of the variable load and variable speed.

7. Means for integrating a variable load traveling at a variable speed, comprising an annular series of spaced triangular shaped teeth rotated at a constant speed, a first induction coil movable parallelly of the axis of rotation of the teeth from the bases to the apexes of the teeth in proportion to the variable load, a first amplifier electrically connected to the first induction coil and having a circuitry adapted to be opened and closed by the position of the first induction coil to a tooth and to a space between the teeth of the first series of teeth, a wheel having the circumference arranged with a series of spaced teeth and rotated at a speed proportional to the variable speed, a second induction coil fixed in proximity to the path of travel of the series of spaced teeth on the wheel, a second amplifier electrically connected to the second induction coil and having a circuitry adapted to be alternatively opened and closed by the rotation of the wheel, the circuitry of both amplifiers are electrically connected to a source of electricity, and a counter electrically connected to and operated by both amplifiers, whereby the number of pulses reaching the counter reflect the product of the variable load and the variable speed.

8. Means for integrating a variable load traveling at a variable speed, comprising a belt conveyor including a load carrying portion, an idler supporting a section of said load carrying portion of the conveyor belt, a scale beam operatively connected to said idler to be deflected in proportion to the load on said section of the conveyor belt, a first annular series of triangular shaped teeth rotated at a constant speed, a bell-crank lever rotatably mounted at its upper end and connected to the scale beam to impart lateral movement to the lower end of the bell-crank lever by deflecttions of the scale beam, a first induction coil carried by said lower end of the bell-crank lever to extend perpendicularly to the axis of the first annular series of teeth and moved parallelly of the axis of rotation of said first annular series of teeth by and in proportion to the deflection of the scale beam, a first amplifier electrically connceted to the first induction coil and having a circuitry adapted to be opened and closed by the position of the first induction coil relative to a tooth and to a space between the teeth of the first annular series of teeth, a second annular series of spaced teeth operatively connected to the conveyor belt and rotated at a speed proportional to the speed of travel of said conveyor belt, a second induction coil fixed in proximity to the path of travel of the second series of teeth, a second amplifier electrically connected to the second induction coil and having a circuitry adapted to be alternatively opened and closed by the rotation of the second series of teeth, the circuitry of both amplifiers being electrically connected to a source of electricity, and a counter electrically connected to and operated by both amplifiers, whereby the number of pulses reaching the counter reflect the product of the load on the section of the conveyor belt supported by the idler and the speed of travel of the conveyor belt.

9. Means for integrating a variable load traveling at a variable speed as claimed in claim 8, wherein the bell-crank lever comprises a head rotatably supported and pivotally connected to the scale beam, a rod fixed at one end portion to the head, and a bracket adjustably mounted on the opposite end portion of the rod and adapted to support the first induction coil.

10. In means for integrating a variable load traveling at a variable speed as claimed in claim 9, wherein a pin is adjustably supported in the bracket to have adjustment longitudinally of the first annular series of teeth, and one end portion of said pin adapted to support the first induction coil to extend transversely of the longitudinal axis of the pin.

11. In means for integrating a variable load traveling at a variable speed as claimed in claim 10, wherein the pin is provided with a pair of holes, one hole representing the normal position of the first induction coil and the other hole representing a simulated load position of the first induction coil, and a locking member adjustably carried by the bell-crank lever bracket to engage either of said holes to retain the first induction coil in the desired position.

12. Means for integrating a variable load traveling at a variable speed as claimed in claim 10, wherein the first induction coil is slidably mounted in said one end portion of the pin to adjust the first end of the first induction coil toward and away from the first annular series of teeth and the second end of the first induction coil being arranged with an annular groove, and a member adjustably mounted in the one end portion of the pin and having a head engaged in said annular groove of the first induction coil, whereby adjustment of said member adjusting the first end of the first induction coil toward and away from the first annular series of teeth.

13. Means for integrating a variable load traveling at a variable speed as claimed in claim 8, wherein the scale beam is pivotally supported adjacent the first end thereof, a spring connected to the second end of the scale beam to deflect the scale beam in proportion to the load supported by the idler, and a weight adjustably mounted on a portion of the scale beam between the pivotal support of the scale beam and the spring connection to balance the scale beam.

14. In means for integrating a variable load traveling at a variable speed as claimed in claim 8, a shaft rotatably mounted in a horizontal plane below the scale beam, and the first annular series of teeth comprises a tubular member mounted at one end on said shaft and the opposite end portion of the tubular member being arranged with said triangular shaped teeth.

15. In means for integrating a variable load traveling at a variable speed as claimed in claim 14, a synchronous electric motor operatively connected to the shaft.

16. Means for integrating a variable load traveling at a variable speed as claimed in claim 8, wherein the second annular series of teeth comprises a wheel rotatably mounted and arranged with equidistantly spaced teeth on its periphery, and said wheel being driven at a speed proportional to the speed of travel of the conveyor belt.

17. Means for integrating a variable load traveling at a variable speed as claimed in claim 16, wherein the belt conveyor comprises an endless belt, a pair of spaced pulleys supporting said endless belt, motive means operatively connected to the first of said pulleys, and gearing operatively connecting the wheel to the second of said pulleys.

References Cited by the Examiner
UNITED STATES PATENTS 2,422,167  6/1947  Hem ------------------ 177—6
2,812,171  11/1957  Charbonnier --------- 177—16

FOREIGN PATENTS 782,896  9/1957  Great Britain.

RICHARD B. WILKINSON, *Primary Examiner.*

LOUIS J. CAPOZI, *Examiner.*

W. F. BAUER, *Assistant Examiner.*